(12) United States Patent
Furuichi et al.

(10) Patent No.: US 8,395,504 B2
(45) Date of Patent: Mar. 12, 2013

(54) IC LABEL FOR PREVENTION OF FORGERY

(75) Inventors: Kozue Furuichi, Kasukabe (JP); Toru Endo, Kasukabe (JP); Manabu Suzuki, Hasuda (JP); Hidehiko Kando, Matsudo (JP)

(73) Assignees: Toppan Printing Co., Ltd., Tokyo (JP); Hitachi, Ltd., Tokyo (JP)

( * ) Notice: Subject to any disclaimer, the term of this patent is extended or adjusted under 35 U.S.C. 154(b) by 889 days.

(21) Appl. No.: 12/227,285

(22) PCT Filed: May 16, 2007

(86) PCT No.: PCT/JP2007/060066
§ 371 (c)(1),
(2), (4) Date: Aug. 5, 2009

(87) PCT Pub. No.: WO2007/132897
PCT Pub. Date: Nov. 22, 2007

(65) Prior Publication Data
US 2009/0303044 A1 Dec. 10, 2009

(30) Foreign Application Priority Data
May 16, 2006 (JP) .............................. P2006-136284

(51) Int. Cl.
*G08B 13/14* (2006.01)
(52) U.S. Cl. ............... 340/568.1; 340/572.3; 368/10
(58) Field of Classification Search ............... 340/568.1, 340/572.3, 10.1, 10.5, 572.5; 368/10
See application file for complete search history.

(56) References Cited

U.S. PATENT DOCUMENTS

| | | | |
|---|---|---|---|
| 7,061,831 B2* | 6/2006 | De La Huerga | 368/10 |
| 7,460,015 B2* | 12/2008 | Forster et al. | 340/572.3 |
| 7,477,151 B2* | 1/2009 | Forster et al. | 340/572.3 |
| 7,598,868 B2* | 10/2009 | Lee et al. | 340/572.1 |
| 2009/0155571 A1* | 6/2009 | Mustonen | 428/327 |
| 2011/0102153 A1* | 5/2011 | Rancien | 340/10.1 |

FOREIGN PATENT DOCUMENTS

| | | |
|---|---|---|
| JP | 10-250228 | 9/1998 |
| JP | 2001-13874 | 1/2001 |
| JP | 2002-211756 | 7/2002 |
| JP | 2003-29637 | 1/2003 |
| JP | 2003-150924 | 5/2003 |
| JP | 2004-258089 | 9/2004 |
| JP | 2005-216054 | 8/2005 |
| JP | 2005-309935 | 11/2005 |

OTHER PUBLICATIONS

Japanese Office Action issued Jun. 7, 2011 in corresponding Japanese Patent Application 2008-515593.
International Search Report mailed on Jul. 31, 2007 in connection with International Application No. PCT/JP2007/060066.

* cited by examiner

*Primary Examiner* — John A Tweel, Jr.

(57) ABSTRACT

An IC label for prevention of forgery includes: a label substrate which has an adhesive agent for affixing the same to an object; a non-contact IC medium which is provided on the label substrate and has an IC chip for storing predetermined identification information and an antenna for wireless transmission of the identification information; and a security function portion which is provided on the label substrate and prevents replication.

13 Claims, 4 Drawing Sheets

IC LABEL FOR PREVENTION OF FORGERY

CROSS REFERENCE TO RELATED APPLICATIONS

This application claims the benefit under 35 U.S.C. Section 371, of International Application No. PCT/JP2007/060066, filed May 16, 2007, which claimed priority to Japanese Application No. 2006-136284, filed May 16, 2006 in the Japanese Patent Office, the disclosures of all of which are hereby incorporated by reference.

BACKGROUND OF THE INVENTION

1. Field of the Invention

The present invention relates to an IC label affixed to an article or packaging for the article in order to prevent forgery.

2. Background Art

Recently, a sealing label is affixed to expensive articles such as luxury liquor and consumable supplies of electric appliances that require forgery prevention and cases for packaging them to verify the authenticity of these articles.

Dealers dealing forged articles may sometimes affix forged sealing labels similar to those for authentic articles to their forged articles. It is difficult for a purchaser to distinguish these forged articles from authentic ones.

To address such a problem, a sealing label with a forgery preventing function provided with an IC tag having a high security function has been proposed (for example, see Patent Document 1). Namely, an IC chip having inherent identification information is buried in an article to distinguish the article.

A security seal with a solvent color developing layer is also known which leaves trace of removal to prevent substitution (for example, see Patent Document 2).

Patent Document 1: Japanese Unexamined Patent Application, First Publication (JP-A) No. 2003-150924

Patent Document 2: Japanese Unexamined Patent Application, First Publication (JP-A) No. H10-250228

SUMMARY OF THE INVENTION

Problems to be Solved by the Invention

Such a sealing label, however, can be easily forged by using a color photocopier or other means. Thus, there is problem in that an IC tag can be easily re-used by someone removing the IC tag from a sealing label affixed to an authentic article and then attaching the IC tag to a forged sealing label, thereby reducing accuracy of authentication.

When only the IC tag is affixed without a sealing label, it is difficult to visually verify the authenticity of the IC tag. In addition, when the IC tag is destroyed, information in the IC tag cannot be read out any more and thus verification of the authenticity becomes impossible.

A conventional solvent color developing paper includes basic dye and color developer in a solvent color developing layer. Printing on the solvent color developing layer has not been considered. In such a conventional solvent color developing paper, since the solvent color developing layer has small cohesive force under the effect of the color developer, there is a problem in that a printed area on an upper layer of the solvent color developing layer often peels off. Even if an amount of the color developer is adjusted to increase the cohesive force, no trace of removal of the solvent color developing layer is left after the label is peeled off with a predetermined solvent. Further, since the solvent color developing layer includes the color developer, the solvent color developing layer may undergo color degradation over time as in thermal paper. Since color degradation becomes evident depending on humidity or temperature, a conventional solvent color developing layer is not suitable for a security seal which is often used over several months.

Means for Solving the Problem

The invention has been made in view of the aforementioned problems, and an object of providing an IC label for prevention of forgery which has improved security function and can be used for high-accuracy verification of authenticity.

In order to solve the above-described problems, the invention provides the following IC labels.

An IC label for prevention of forgery according to the invention includes: a label substrate which has an adhesive agent for affixing the same to an object; a non-contact IC medium which is provided on the label substrate and has an IC chip for storing predetermined identification information and an antenna for wireless transmission of the identification information; and a security function portion which is provided on the label substrate.

It may be arranged such that the security function part is alternatively used to prevent replication.

It may be arranged such that the label substrate is formed of a breakable material.

It may be arranged such that the label substrate includes a solvent detection portion which is dissolved by a peeling solvent for peeling the label substrate affixed to the object, or reacts chemically with the peeling solvent.

It may be arranged such that the label substrate includes a heat detection portion which undergoes color change when heated or reacts chemically by the effect of heat.

It may be arranged such that the identification information is intrinsic identification information for each IC chip.

It may be arranged such that the identification information is correlated with management information for management of the object.

It may be arranged such that the IC chip includes a read-only memory; and the identification information is stored in the read-only memory.

It may be arranged such that the security function portion includes at least one of: an OVD functional material which undergoes color change depending on an angle of light incident on the security function portion or an angle of visual recognition of the security function portion; a fluorescent material or a phosphorescent material excited by electromagnetic waves of a specified wavelength to emit electromagnetic waves of a wavelength different from that of the specified wavelength; and a liquid crystal material which has polarizability of a specific pattern and displays the pattern by taking out specifically polarized light.

It may be arranged such that the label substrate includes an optical identification portion which has optically readable optical identification information; and the identification information and the optical identification information are at least partly correlated with each other.

It may be arranged such that the security function portion and the optical identification portion are provided on the same surface of the label substrate.

Advantageous Effect of the Invention

According to the above-described IC label, since the IC label for prevention of forgery according to the invention includes the IC chip storing predetermined identification information and the security function portion for preventing replication, double security management is realized by electrical verification with the IC tag and visual verification with the security function portion. Thus, high-accuracy verification of authenticity can be provided.

Specifically, even if someone attempts to replicate the label substrate by using a color photocopier or other means, the security function layer prevents the replication of the original. For this reason, any improper acts including forgery using a color photocopier, counterfeiting and modification can be prevented. Further, more reliable and rapid verification is realized by irradiating the security function portion with light having a predetermined function. Mechanical verification may also be possible by using a light receiving element for detecting the security function portion.

In addition, the identification information stored in the IC chip facilitates identification of each IC chip. The identification information and information on the optical identification portion provided on a surface of the label substrate are correlated to each other to provide security management using the pair of the IC chip and the label. Specifically, an article with a label having an IC chip belonging to another label can easily be identified as a forgery. The IC chip may store a variety of information other than the information on security management, traceability relating to distribution or other information may also be provided. Thus, items of value or personal information can be under strict control.

DESCRIPTION OF THE REFERENCE NUMERALS

Figure 1:
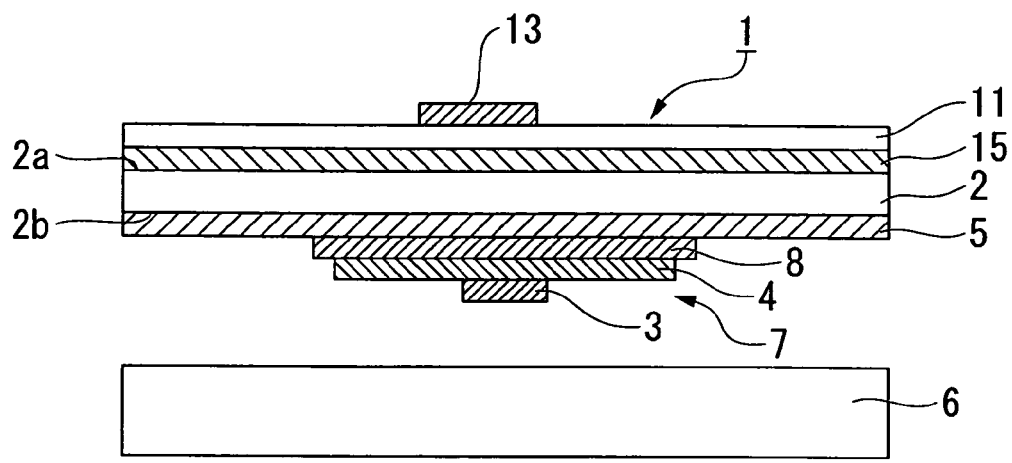
FIG. 1 is a sectional side view of an IC label for prevention of forgery and a peel off sheet of a first embodiment of the IC label for prevention of forgery according to the invention.

1: IC label (IC label for prevention of forgery)
2: label substrate
3: IC chip
4: antenna
5: adhesive layer (adhesive agent)
6: peel off sheet
7: IC tag (non-contact IC medium)
12: number printed portion (optical identification portion)
13: security function layer (security function portion)
15: solvent color developing layer (solvent detection portion)

BEST MODES FOR CARRYING OUT THE INVENTION

Referring now to the drawings, IC labels (IC labels for prevention of forgery) according to the embodiments of the invention will be described.

Figure 2:
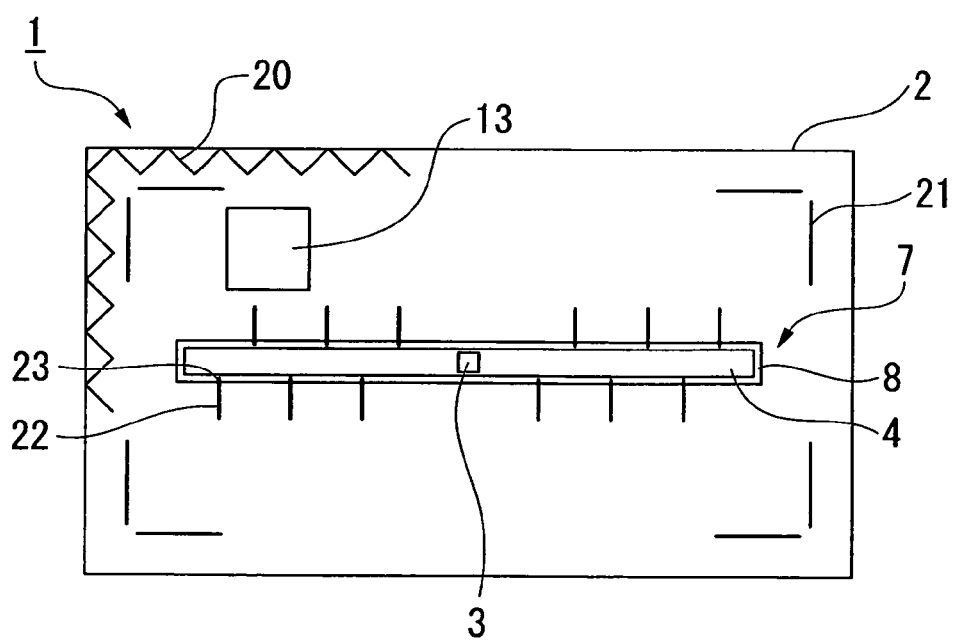
FIG. 2 is a plan view of the IC label for prevention of forgery.

FIGS. 1 and 2 show an IC label according to a first embodiment of the invention.

First Embodiment (Structure and Operation of IC Label 1)

An IC label (IC label for prevention of forgery) 1 has a rectangular sheet-shaped label substrate 2.

The label substrate 2 has two principal planes. A later-described solvent color developing layer (solvent detection portion) 15 is provided on a first principal surface 2a. A printed layer 11, having various information including an object name printed thereon, is provided on the solvent color developing layer 15.

An adhesive layer (an adhesive agent) 5 to be attached to the label substrate 2 on the object is provided on a second principal surface 2b of the label substrate 2.

An IC tag (non-contact IC medium) 7 for wireless communication is provided on a surface of the adhesive layer 5. A peel off sheet 6 which can be easily peeled off is temporarily affixed to the surface of the adhesive layer 5. A separator which includes a paper or plastic sheet with a release agent layer coated thereon is used as the peel off sheet 6. The release agent layer is made of silicon resin or other material.

The IC tag 7 has a passive IC chip with no driving battery. Instead of the passive IC chip, an active IC chip with a driving battery for the IC chip may be used. With the active IC chip, although a reading range can be extended, the structure of the IC tag 7 becomes complicated.

The IC tag 7 is affixed to the adhesive layer 5 via a base film 8. The IC tag 7 has an antenna 4 formed of metal such as aluminum and copper, and an IC chip 3 disposed at a longitudinal direction central portion of the antenna 4 and electrically connected to the antenna 4.

The antenna 4 can be provided as a dipole antenna with sufficient electric wave transmitting and receiving efficiency when, for example, the electric wave transmitted and received has a frequency higher than that of the microwave, a wavelength of a working frequency is set to λ and the length of the antenna 4 is set to about λ/2.

For example, when the working frequency of the electric wave is set to 2.45 GHz, the optimal length of the dipole antenna 4 is about 40 to 60 mm.

The antenna 4 receives electric waves from an unillustrated information reader and supplies potential difference produced along a longitudinal direction of the antenna 4 to the IC chip 3 as driving power. When the antenna 4 receives electric waves with intensity high enough to supply sufficient electric power for operation of the IC chip 3, the IC chip 3 becomes in its operating state.

A general IC label for prevention of forgery is manufactured such that it cannot be peeled off without destruction of the IC chip, namely, that substitution without breakage of the IC chip is difficult. Accordingly, unintentional breakage of the IC chip of the affixed IC label for prevention of forgery is a very serious problem, and thus a hard-to-break IC chip is required.

An IC chip of 0.5 mm or less in both width and depth and 0.1 mm or less in height is highly resistant to mechanical destruction. This is described in the following reference along with a technical source: Kazuo Takaragi, et al, "An Ultra Small Individual Recognition Security Chip" IEEE MICRO, NOVEMBER-December 2001, 2001.

Accordingly, an IC chip of 0.5 mm or less in both width and depth and 0.1 mm or less in height may prevent destruction of the IC chip.

The IC chip 3 according to the present embodiment has a square shape with 0.5 mm in side dimension and 0.1 mm in height.

The side dimension is not necessarily 0.5 mm, and may be suitably determined.

The IC chip 3 may alternatively be rectangular-shaped, or may have any suitable shape.

The chip of this size has already been realized by Hitachi, Ltd., in the name of "μ chip" (registered trademark) with 0.4 mm in width, 0.4 mm in depth and 0.1 mm in height. It is therefore well-known that such an IC chip can be mass-produced technically.

When the IC chip 3 is irradiated with electric waves with intensity high enough to supply sufficient electric power for operation of the IC chip 3, the antenna 4 receives electric waves and supplies electric power to the IC chip 3, which then becomes in its operating state.

The information reader may modulate emission intensity of electric waves it emits, and may also change timing and phase of the modulation in the process of the modulation. In this manner, the information reader sends timing signals and commands to the IC chip 3 in a superimposed manner on the emitted electric waves.

The IC chip 3 returns information the IC chip 3 possesses to the information reader in response to the timing signals and commands superimposed on the electric waves from the information reader. For example, the IC chip 3 changes the intensity of the electric waves re-emitted from the IC tag 7 by altering impedance values in the IC chip 3 according to the intensity modulation of the electric waves emitted from the information reader based on the information in the IC chip 3. The information reader reads information stored in the IC chip 3 by measuring intensity of the re-emitted electric waves.

A transmission procedure of timing signals and commands from the information reader to the IC chip 3 and an information transmission procedure from the IC chip 3 to the information reader are called "air protocol".

If the working frequency is lower than that of microwaves, and is 13.56 MHz for example, a coiled antenna is often used instead of the dipole antenna.

The foregoing description relates to an information reading operation of the IC chip used in the IC label for prevention of forgery.

If someone attempts to peel the label substrate off, the IC tag will be broken. As a result, efficiency in generating voltage difference in the longitudinal direction of the antenna may decrease, an impedance matching condition between the antenna and the IC chip may decline, and electrical connection between the antenna and the IC chip may be broken. Thus, operation of the IC chip may be stopped and information is no longer read out properly from the IC chip. That the information cannot be read from the IC chip means the occurrence of a malfunction of the antenna and the IC chip, and decline in the matching condition between the antenna and the IC chip. This implies that someone has attempted, or is currently attempting, to destroy or peel off the IC label for prevention of forgery.

Although the IC tag 7 is provided on the surface of the adhesive layer 5 in the present embodiment, the adhesive layer 5 may be coated on the surface of the IC tag 7. In this case, when the label substrate 2 is peeled off from the object, the IC tag 7 may be left on the object. It is thus preferable that the IC tag 7 be reliably broken in an attempted removal of the label substrate 2 by providing later-described cut-outs in the IC tag 7.

(Identification Information and Replication Prevention of IC Label 1)

In the IC tag 7 of the present embodiment, an identification ID (i.e., identification information) for identifying the IC chip 3 is stored in the IC chip 3. That is, the IC chip 3 has a memory in which the identification ID is stored.

In the present embodiment, a security function layer (i.e., a security function portion) 13 is provided in a first principal surface 2*a* of the label substrate 2 in order to prevent replication of the label substrate 2.

Preferably, the security function layer 13 is formed of a material of which authenticity can be verified visually or using a simple device. Examples of such materials may include (1) an optical variable device (OVD) functional material, (2) a fluorescent material or a phosphorescent material and (3) a liquid crystal material.

The security function layer 13 according to the present embodiment includes at least one of (1) the OVD functional material, (2) the fluorescent materials or the phosphorescent material or (3) the liquid crystal material.

(1) The OVD functional material, (2) the fluorescent material or the phosphorescent material and (3) the liquid crystal materials will be described in this order.

(1) The OVD functional material will be described first.

The optical variable device (OVD) is a display body which produces an image using interference of light. The image undergoes color change (color shift) and generates a stereoscopic image depending on viewing angles. Thus, authenticity of the OVD can be verified visually. Examples of the OVD such as a hologram and diffractive grating may include a relief type hologram in which a light interference pattern is recorded on a plane as a fine, uneven pattern, and a volume hologram in which an interference pattern is recorded along the thickness direction (i.e., the depth direction).

Although its process differs from those of the hologram and diffractive grating, a multilayered film in which thin films of ceramic and metallic materials with different optical properties are laminated, and a material which undergoes color shift and is made of, for example, a liquid crystal material may also be used. The OVD gives a distinct impression through the stereoscopic image or color shift and requires advanced technology for manufacture. Thus, OVD is suitable for the security function layer 13 in view of forgery prevention.

In consideration of mass productivity and cost, among these OVDs, the relief type hologram (or the relief type diffractive grating) and the multilayered film are preferred and used widely.

(Relief Type Hologram or Relief Type Diffractive Grating)

The relief type hologram or the relief type diffractive grating is mass-produced using a relief type press plate with a fine uneven pattern thereon forming a hologram or diffractive grating. That is, the OVD forming layer is heated and pressurized by the press plate to replicate the fine uneven pattern.

The OVD forming layer is for improving the diffraction efficiency, and is made of a material with refractive index different from that of the polymer material which constitutes the relief surface. Examples of the materials of the OVD may include high refractive index materials such as $TiO_2$, $Si_2O_3$, SiO, $Fe_2O_3$ and ZnS with different refractive index, and metallic materials such as Al, Sn, Cr, Ni, Cu and Au with high reflection effect. These materials are used singly or in a laminated state in the OVD forming layer. These materials are formed by publicly known methods for coating thin films such as a vacuum deposition method and sputtering. The layer may have a thickness of about 0.5 to 100 nm depending on intended purposes.

The hologram preferably has a limited area for metal deposition or be a transparent hologram of a nonmetallic deposition material so as not to interfere with communication of the IC tag 7.

(Multilayered Film)

In the multilayered film process, the OVD forming layer is formed of a multilayered thin film layer having different optical properties. The OVD forming layer is formed as a compound thin film by laminating a metallic thin film, a ceramic thin film, or both of them. For example, when laminating thin films with different refractive indices, the thin film of high refractive index and the thin film of low refractive index may be combined, and it may be made to be alternately laminated in specific combinations. A desired multilayered film can be obtained with these combinations.

The multilayered thin film layer is formed by laminating about two or more high refractive index materials and low refractive index materials having a refractive index of about 1.5 at a predetermined film thickness. The materials may be ceramic, metal and organic polymer. Examples of materials used will be given below.

Ceramic materials may include $Sb_2O_3$ (refractive index n: 3.0, the same in the following), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (2.0), $WO_3$ (2.0), SiO (2.0), $Si_2O_3$ (2.5), $In_2O_3$ (2.0), PbO (2.6), $Ta_2O_3$ (2.4), ZnO (2.1), $ZrO_2$ (2.0), MgO (1.6), $SiO_2$ (1.5), $MgF_2$ (1.4), $CeF_3$ (1.6), $CaF_2$ (1.3 to 1.4), $AlF_3$ (1.6), $Al_2O_3$ (1.6) and GaO (1.7).

Materials of the thin films of single metal or alloy may include Al, Fe, Mg, Zn, Au, Ag, Cr, Ni, Cu and Si.

Organic polymers of low refractive index may include polyethylene (1.51), polypropylene (1.49), polytetrafluoroethylene (1.35), polymethylmethacrylate (1.49) and polystyrene (1.60).

At least one of these high refractive index materials and the metallic thin film with transmittance of 30 to 60%, and at least one of the low refractive index materials are alternately laminated at a predetermined thickness. In this manner, a multilayered thin film layer having absorption or reflection to visible light of a specific wavelength is obtained.

Optical properties such as refractive index of the metal thin film may vary depending on the state or formation conditions of the components. Thus, the values shown herein are examples under a certain condition.

Among these materials, materials are suitably selected based on the optical properties such as refractive index, reflectance, transmittance, weather resistance and inter-layer adhesiveness and laminated to form a multilayered thin film layer. Publicly known processes such as normal vacuum deposition and sputtering can be employed for the manufacture of the multilayered thin film layer. These processes enable control of film thickness, film formation rate, the number of films in the lamination or optical film thickness (i.e., n·d, n: refractive index, d: film thickness).

These OVDs (i.e., hologram, diffractive grating, or multilayered thin film layer) are formed as a thin foil, and are transferred to the IC label 1, entrained in the label, or printed with ink in which a fine OVD foil is dispersed in a resin binder. In this manner, a security function layer 13 which allows no substitution and re-use can be obtained.

(2) Next, the fluorescent material or the phosphorescent material will be described.

Controlled ink or rarely available special ink may be printed on the IC label 1 as the fluorescent material or the phosphorescent material. The controlled ink may include ink which is manufactured, sold and shipped under control of a manufacturer from the security viewpoint and thus is hardly commercially available. The special ink may include expensive ink which is manufactured by using rare and expensive material or ink manufactured using materials which exhibit special physical phenomena. Thus, authenticity of the security function layer 13 can be visually verified using, as needed, a simple recognizer.

For example, a fluorescence coloring portion is formed as a security function layer 13 by printing or entraining the ink which becomes luminous when irradiated with ultraviolet or infrared light, fluorescent ink, fluorescent fiber, or the like.

Images of characters or patterns (fluorescence coloring portion) produced using ink which becomes luminous when irradiated with ultraviolet or infrared light become luminous when irradiated by a black lamp (ultraviolet light) or infrared light (not less than 780 nm). As a result, the image that was not detected under visible light (400 to 700 nm) can be recognized visually or via a light receiving element. Since such an image returns a specified wavelength inherent to the material, verification using a simple recognizer can be easily and reliably conducted. Colorless, transparent materials are preferably used for the fluorescence coloring portion. These materials have varying color patterns due to irradiation of ultraviolet or infrared light and when dispersed in ink resin, have the same or approximate refractive index as that of the ink resin.

Examples of the fluorescent material or phosphorescent material may include phosphors.

The phosphors include an ultraviolet light luminescence phosphor and an infrared light luminescence phosphor. Examples thereof will be given below.

The ultraviolet phosphor emits light in a visible wavelength region when irradiated with ultraviolet light. Examples of the ultraviolet phosphor may include $Ca_2B_5O_3Cl:Eu^{2+}$, $CaWO_4$, $ZnO:Zn_2SiO_4:Mn$, $Y_2O_2S:Eu$, ZnS:Ag, $YVO_4:Eu$, $Y_3O_3:Eu$, $Gd_2O_2S:Tb$, $La_2O_2S:Tb$ and $Y_3Al_5O_{12}:Ce$.

These phosphors are added in the ink in an amount such that the luminescence is visually confirmed or fluorescence can be detected by the light-receiving element of the detector when irradiated with black light.

The infrared light luminescence phosphor may emit light in a visible wavelength region, or light in an infrared wavelength region when irradiated with infrared light.

Examples of the former phosphors may include $YF_3:YB$, Er and ZnS:CuCo.

Examples of the latter phosphors may include $LiNd_{0.9}Yb_{0.1}P_4O_{12}$, $LiBi_{0.2}Nd_{0.7}Yb_{0.1}P_4O_{12}$, $Nd_{0.9}Yb_{0.1}Nd_5(MoO_4)_4$, $NaNb_{0.3}Yb_{0.1}P_4O_{12}$, $Nd_{0.8}Yb_{0.2}Na_5(WO_4)_4$, $Nd_{0.8}Yb_{0.2}Na_5(Mo_{0.5}WO_{0.5})$, $Ce_{0.05}Gd_{0.05}Nd_{0.75}Yb_{0.25}Na_5(W_{0.7}Mo_{0.3}O_4)_4$, $Nd_{0.3}Yb_{0.1}Al_3(BO_3)_4$, $Nd_{0.9}Yb_{0.1}Al_{2.7}Cr_{0.3}(BO_3)_4$, $Nd_{0.4}P_5O_4$ and $Nd_{0.8}Yb_{0.2}K_3(PO_4)_2$. The latter phosphor emits infrared light which has a peak of emission spectrum from 980 to 1020 nm when irradiated with light of a wavelength of nearly 800 nm.

The infrared light luminescence phosphor is added in the ink in an amount such that the light emission is visually confirmed or fluorescence can be detected by the light-receiving element of a detector.

A security function layer 13 with improved forgery prevention effect is obtained using special ink in which the fluorescent material or the phosphorescent material is added. The ink is printed on the surface of the label substrate 2, entrained in the label substrate 2, or the printed or entrained ink is shaped into a special form including a star-shape.

(3) Next, a liquid crystal material will be described.

An example of the liquid crystal material is cholesteric liquid crystal.

The cholesteric liquid crystal is helically oriented, and has polarized light separation ability to reflect right and left handed circular polarized light of a specific wavelength. The wavelength to be reflected is decided by helical pitches, and whether right handed or left handed circular polarized light is decided by the direction of the helix. In ordinary observation light, the right and left handed polarized light are intermingled and thus the image cannot be recognized. However, by making only one of the right and left handed polarized light transmit through a polarizing filter, an image can be recognized. This is called a latent image technique. Since the reflected wavelength changes with angles of the reflected light, the cholesteric liquid crystal can camouflage the image when used as color shift ink.

The liquid crystal material is not limited to the cholesteric liquid crystal, and materials with effects similar to those of the cholesteric liquid crystal may be used.

(Breakability of Label Substrate)

The label substrate 2 according to the present embodiment has breakability.

That is, the label substrate 2 is formed by a film and paper which have breakability.

Examples of the material for the label substrate 2 may include a synthetic resin film and a film formed via solution film formation of high crystalline plastic materials. The synthetic resin film may include brittle vinyl chloride and brittle polyester formed by mixing a suitable amount of plasticizers such as kaolin and calcium carbonate and then making them brittle. The high crystalline plastic materials may include cellulose acetate, low density polyethylene, polystyrene and polyphenylene sulfide. Other materials may include a film which is formed of UV-curing composition resin, made by mixing powders such as UV-curing composition resin, kaolin and calcium carbonate, and then curing and drying under UV irradiation.

Examples of the paper include nonwoven fabric with synthetic fiber, art paper, coated paper and paper of fine quality.

Since the label substrate 2 is broken when someone attempts to remove the IC label 1 affixed to the object, the label substrate 2 with breakability has a forgery prevention effect.

The label substrate 2 has cut-outs 20, 21 and 22 as shown in FIG. 2 for easy breakage.

The configuration of the cut-outs 20 and 21 may be a straight line or curved line, or may be changed suitably as needed. The cut-out 23 may also be formed in the base film 8 for easy breakage of the antenna 4 at the time of removal of the IC label 1. The antenna 4 may also be formed of a breakable base material. For example, vinyl chloride, coated paper or other material with breakability can be used.

The cut-out 23 is formed in the base film 8. However, the cut-out 23 is not formed in the antenna 4.

In this manner, the label substrate 2 and the antenna 4 are broken from the cut-outs 22 and 23, and their functions as the non-contact IC label can be destroyed completely. If the cut-out 23 is provided not in the antenna 4 but in the base film 8, deterioration in efficiency of the antenna 4 can be prevented and the antenna 4 is still easily broken.

The cut-out 23 may be provided to reach the antenna 4. In this case, the antenna 4 can be broken still more easily.

(Solvent Color Developing Layer)

A solvent color developing layer (solvent detection portion) 15 is provided on the first principal surface 2a of the label substrate 2 according to the present embodiment.

The solvent color developing layer 15 dissolves the label substrate 2 affixed to the object in a peeling solvent. The solvent color developing layer 15 may alternatively be reacted chemically with the peeling solvent.

In the solvent color developing layer 15, dye particles which are insoluble in water and soluble to organic solvent are kept in a resin binder in the dispersed state. An adhesive agent of the adhesive layer 5 is soluble in the organic solvent. Even if someone attempts to remove the label substrate 2, in an attempted removal of the IC label 1, from the object using an organic solvent with low solubility (e.g., ethyl alcohol or acetone used as a nail-polish remover), a commercial seal stripping liquid or other material, the dye held in its dispersed state in the solvent color developing layer 15 dissolves and a trace of removal remains in the label substrate 2 as developed color. That is, the solvent color developing layer 15 has a solvent coloring function.

Any dye particles may be used in the invention as long as they are insoluble in water and soluble in organic solvents. Among them, leuco dye and fluorescent brightener may be used.

It is also assumed that the IC label 1 is removed by softening the adhesive agent of the adhesive layer 5 with heat using, for example, a drier. In this case, the temperature of the dye never reaches the melting temperature and thus no trace of removal is left as developed color. Therefore, such a dye has insufficient forgery prevention effect.

To address this problem, a thermal developing material, in which leuco dye and color developer that combines with the leuco dye through thermal stimulation are dispersed, is provided on the solvent color developing layer 15. The thermal developing material develops color in response to thermal stimulation. In this case, the solvent color developing layer 15 has a thermal coloring function. In the thermal coloring, colorlessness or light-colored leuco dye is preferably used and, upon thermal reaction, color is developed with the leuco dye as a color tone.

If the solvent color developing layer 15 has at least one of the solvent coloring function and the thermal coloring function, the effect of the invention can be obtained.

(Breakability of Label Substrate 2 and Adhesion of Adhesive Layer 5)

In order to leave a trace of removal of the label substrate in the label for forgery prevention, it is preferable to set the adhesion (adhesive strength) of the adhesive layer equal to the smallest one of the tensile strength, breaking strength, or tearing strength of the label substrate so that the label substrate may be broken when someone attempts to remove the label substrate from the object.

Accordingly, in the present embodiment, when the label substrate 2 formed, for example from 70 g/m$^2$ paper of fine quality is used, adhesion (JIS Z0237) of the adhesive layer 5 is set as not less than 8000 mN/25 mm. When an adhesive agent which produces an adhesion operation without undergoing a curing process (i.e., a pressure-sensitive adhesive) is used, the upper limit of the adhesion is set to 150 N/mN. However, when an adhesive agent which produces a powerful adhesion operation after the curing process is used, the adhesive layer may possess even larger adhesion (adhesive strength).

Adhesion of the adhesive layer is preferably larger than the breaking strength of the label substrate. When making the label substrate easier to break by providing cut-outs in the label substrate, the label substrate can leave a trace of removal if the adhesion is not less than 8000 mN/25 mm.

(JIS Z0237 Adhesion Test)

Here, an adhesion test prescribed in JIS Z0237 will be described.

First, test pieces (25 mm in width, 250 mm in length, number of tests: 3) each with an adhesive layer formed thereon are affixed to stainless plates. The test piece is peeled off along a direction in which the piece is folded 180 degrees from the stainless plate with great force, pulling the test piece with the force of 300 mm/min. The force required for peeling is measured at four points at intervals of 20 mm. The same test is conducted for the three test pieces and an average value is considered as the value of adhesion (unit: mN/25 mm).

As described above, according to the IC label 1 in the present embodiment, even if someone attempts to replicate the label substrate 2 by using a color photocopier or other means, the security function layer 13 prevents the replication of the original. For this reason, any improper acts including forgery using a color photocopier, counterfeiting and modification can be prevented. Further, more reliable and rapid verification is realized by irradiating with special light. Mechanical verification may also be possible by using a light receiving element.

The identification information stored in the IC chip 3 facilitates identification of each IC chip 7.

With this configuration, double security management is realized by electrical verification with the IC tag 7 and visual (optical) verification with the security function portion 13. Thus, high-accuracy verification of authenticity can be provided. The IC chip 3 may also store a variety of information other than the information on security management, and traceability relating to distribution or other information may also be provided. Thus, items of value or personal information can be strictly controlled.

Since the label substrate 2 has breakability, when someone attempts to peel off the label substrate 2 affixed to the object, the label substrate 2 is easily broken with the force for peeling off. Accordingly, removal of the label substrate 2 in its entire state can be prevented.

Further, since the adhesion of the adhesive layer 5 is set to not less than 8000 mN/25 mm, if someone attempts to peel off the label substrate 2 affixed to the object, the label substrate 2 is broken reliably. Alternatively, a trace of removal of the label substrate 2 may be left.

Since the cut-outs 20, 21, 22, and 23 are provided in the label substrate 2 and the base film 8, if someone attempts to peel off the label substrate 2, the label substrate 2 is broken reliably. The antenna 4 may also be broken at the same time and thus reading of the information stored in the IC chip 3 becomes impossible.

Since the solvent color developing layer 15 is provided in the label substrate 2, the label substrate 2 develops color to leave a trace of removal if someone attempts to peel off the label using any solvent or commercial seal stripping liquid.

As described above, in the IC label 1 according to the present embodiment, the IC chip 3 of 0.5 mm or less in both width and depth and 0.1 mm or less in height is used, the security function layer 13 is provided on the surface of the IC label 1, a breakable material is used as the label substrate 2, and the solvent color developing layer 15 is provided. With this configuration, the IC label 1 is hardly peeled off, and is hardly forged by, for example, photocopying the surface of the label substrate 2. Further, the IC chip 3 is hard to be destroyed. Thus, the maximum forgery prevention effect and crime prevention effect can be provided at all times.

(Usage of IC Label 1)

The IC label 1 is preferably affixed to a position such that someone who attempts forging inevitably peels off or breaks the IC label 1.

For example, an article which requires forgery prevention is placed in a case from an opening and the case is closed with a lid. The IC label 1 is attached to straddle the interface between the case and the lid to seal the same. When someone separates the lid from the case in order to take out the article which requires forgery prevention, the sealing IC label 1 is inevitably broken. As a result, it becomes evident that someone has opened the lid.

That someone has opened the lid can be determined from the fact that the IC tag 7 of the IC label 1 is broken upon opening and the information on the IC chip 3 cannot be read out.

Accordingly, a secret attempt to open the lid and take the article that requires forgery prevention out of the case is difficult to execute. Thus, the forgery prevention effect and the crime prevention effect are obtained.

Visual confirmation of breakage of the IC label 1 and confirmation that the information stored in the IC chip 3 can be read out should be repeated regularly. Even if the label substrate 2 is not broken and the information on the IC chip 3 can be read out at a certain checking time, breaking of the label substrate 2 or impossibility of reading the IC chip 3 may be recognized at the next checking time. In this case, it can be estimated that the lid was opened at any time between these checking events. Accordingly, a secret attempt to open the lid and take the article that requires forgery prevention out of the case is difficult to execute. Thus, the forgery prevention effect and the crime prevention effect are obtained.

The information reader may frequently (namely, every second) repeat reading the IC chip 3 and determine that a breaking act of the IC label 1 has occurred when the information cannot be read from the IC chip 3. In accordance with the determination, a system is activated to execute the following operations.

(1) automatically notify an administrator, a guard, or the police of the determination result with sound, light, telephone, or via a remote connecting means such as a wireless and network connection (2) in response to the determination, automatically photograph and video photograph a circumference state of the IC label 1

(3) in response to the determination, automatically save images and animation on the camera and the videotape capturing the circumference state of the IC label 1

(4) in response to the determination, automatically ring an alarm (5) in response to the determination, automatically start turning-on and blinking of a warning lamp (6) in response to the determination, automatically activate a spatial interrupting device, including closing a door (7) in response to the determination, automatically stop operation of an apparatus to which the IC label 1 is affixed or its peripheral equipment (8) in response to the determination, automatically activate a mechanical lock on an apparatus to which the IC label 1 is affixed or its peripheral equipment With this configuration, the forgery prevention effect and the crime prevention effect are obtained.

Deployment of such an automatically activating forgery preventing system may be displayed in the vicinity of the article to which the IC label 1 is affixed, or may be notified to persons who may possibly be near the article to which the IC label 1 is affixed. This may prevent occurrence of forgery or criminal acts.

In the IC label 1 according to the present embodiment, the IC chip 3 of 0.5 mm or less in both horizontal and vertical sizes and 0.1 mm or less in thickness may be used, the security function layer 13 may be provided on the surface of the IC label 1, and a breakable material may be used as the label substrate 2. With this configuration, the IC label 1 is hardly peeled off, and is hardly forged by, for example, photocopying the surface of the label substrate 2. Further, the IC chip 3 is hard to be destroyed. Thus, the maximum forgery prevention effect and crime prevention effect can be provided at all times.

Note that the information stored in the IC chip 3 according to the present embodiment may be read-only information. That is, the IC chip 3 may have a read-only (not re-writable) memory in which the identification ID or other information is stored.

In this manner, after the IC label 1 is affixed to the object and the identification ID is stored in the memory of the IC chip 3, the IC label 1 cannot be removed and the identification ID cannot be lost from the object, and the identification ID cannot be counterfeited. Thus, forgery of the label by photocopying the surface of the label substrate 2 can further be prevented.

Accordingly, there is an advantageous effect that authenticity of the identification ID can always be ensured.

Verification of authenticity and validity of the identification ID mean increased accuracy in read-out of the identification ID from the IC chip 3, and means, in turn, increased accuracy in detecting the impossibility of read-out of the identification ID. Accordingly, the above-described forgery prevention effect and crime prevention effect are further enhanced.

The identification ID stored in the IC chip 3 may be the read-only, unique ID. That is, the identification ID is defined as intrinsic identification ID (intrinsic identification information) for each IC chip 3.

In this case, after the IC label 1 is affixed to the object, the IC label 1 cannot be removed from the object, and the intrinsic identification ID is lost from the object. Further, the intrinsic identification ID cannot be counterfeited. In addition, duplicate registration of the identification ID which may often occur in a rewritable IC chip 3 can be prevented. Accordingly, there is an advantageous effect that authenticity and validity of the identification ID can always be ensured.

(Control of Intrinsic Identification ID)

In order to provide intrinsic, unique identification ID, control can be made in the following manner.

Upon receiving an order of the IC label 1 from a customer, a person orders the IC label 1 from a manufacturer of the IC label 1. The manufacturer of the IC label 1 orders an IC tag 7 from a manufacturer of the IC tag 7. The manufacturer of the IC tag 7 orders an IC chip 3 from a manufacturer of the IC chip 3. The manufacturer of the IC chip 3 requests issue of intrinsic identification ID to an ID manager.

It should be noted that the person who receives the order, the manufacturer of the IC label 1, the manufacturer of the IC tag 7, the manufacturer of the IC chip 3 and the ID manager may be in whole or in part the same person or organization. Several persons or organizations may also exist.

(Issue of Intrinsic Identification ID)

The ID manager has saved, in an ID issuing device, information on identification IDs issued in the past (issued identification ID) and identification IDs which are not preferably assigned from the viewpoint of management. The ID issuing device newly issues intrinsic identification ID with inherent characteristic while avoiding the issued identification IDs and identification IDs which are not preferred. An ID issuer issues the intrinsic identification ID with inherent characteristic using the ID issue device.

The ID manager may entrust the ID management business to an ID management organization. The ID manager specifies in advance ID space to be entrusted to the ID management organization. The ID space is a set of addressable IDs. If plural ID management organizations exist, the ID manager should address the ID space to each ID management organization so as not overlap the spaces. The ID management organization has an ID issuing device. The ID issuing device stores information on identification IDs issued in the past (issued identification ID), identification IDs which are not preferably assigned from the viewpoint of management, and available ID spaces. The ID management organization newly issues, using the ID issuing device, intrinsic identification ID with an inherent characteristic that does not overlap with those of the identification ID issued by any other ID issuing devices belonging to any other ID management organization, or those of the IDs issued by the ID issuing device belonging to the ID manager.

The ID issuing device belonging to the ID manager or the ID management organization issues new intrinsic identification ID which has an inherent characteristic, and additionally registers as a newly issued identification ID to the identification ID issued in the past. The intrinsic identification ID with the newly issued inherent characteristic is notified to the manufacturer of the IC chip 3.

Although description herein relates to persons such as the ID manager or the ID management organization, any devices, programs or systems for indicating the ID issuing device to issue IDs automatically in response to reception of orders may be employed.

(Manufacture of IC Chip with Intrinsic Identification ID)

Based on the thus-obtained intrinsic identification ID with the inherent characteristic, the manufacturer of the IC chip 3 manufactures an IC chip 3 using an IC chip manufacturing apparatus. Since not all the obtained intrinsic identification IDs are necessarily recorded on the IC chip 3 due to the yield of manufacture of the IC chip 3, the intrinsic identification ID should be re-recorded in the process of delivery inspection of the IC chip 3.

(Manufacture of IC Tag)

Based on the thus-obtained IC chip 3, the manufacturer of the IC tag 7 manufactures an IC tag 7 using an IC tag manufacturing apparatus. Since not all the obtained IC chips 3 are necessarily shipped as the IC tags 7 due to the yield of manufacture of the IC tag 7, the intrinsic identification ID recorded on the IC chip 3 should be read out and re-recorded in the process of delivery inspection of the IC tag 7.

(Manufacture of IC Label)

The manufacturer of the IC label 1 manufactures an IC label 1 based on the obtained IC tag 7 using a label manufacturing apparatus. Since not all the obtained IC tags 7 are necessarily shipped as the IC labels 1 due to the yield of manufacture of the IC label 1, the intrinsic identification ID recorded on the IC chip 3 in the process of delivery inspection of IC label 1 should be read out and re-recorded in the process of delivery inspection of the IC label 1.

(Delivery of IC Label)

The person who received the order receives the IC label 1 from the manufacturer of the IC label 1 and supplies the IC label 1 to the person who ordered. At this time, the person who received the order receives a list of intrinsic identification IDs recorded on the existing IC chips 3 in the IC labels 1 from the manufacturer of the IC label 1, and may also supply the list to the person who ordered.

With this process, an IC label 1 with an IC chip 3 having intrinsic identification ID with an inherent characteristic recorded thereon can be obtained reliably. After the IC label 1 according to the present embodiment having intrinsic identification ID is affixed to an object, the IC label 1 cannot be removed and the identification ID cannot be lost from the object, and the identification ID cannot be counterfeited. Further, the intrinsic identification IDs cannot overlap with one another. Thus, forgery of the label by photocopying the surface of the label surface can be prevented. Accordingly, authenticity and validity of the identification ID can always be ensured.

(Control with Identification ID)

When the identification ID stored in the IC chip 3 is a read-only ID and the identification ID is a unique ID, memory content of the IC chip 3 cannot be updated with the management information of the object to which the IC label 1 is affixed. Accordingly, the management information of the object is registered in a database together with the information including the identification ID via a data management device connected to the information reader. The contents of the database are updated if needed.

When the information including the identification ID stored in the IC chip 3 is read out by the information reader, management information of the object is retrieved in a corresponding database via a data management device based on the information including this identification ID. The obtained management information is returned to the data management device or the information reader. It is then determined whether the returned management information corresponds with the current state of the IC label 1 and the object to which the IC label 1 is affixed. In this manner, whether or not any improper acts including forgery have occurred is checked.

That is, the identification ID is related with the management information for managing the object.

The management information for managing the object may include shape, color, part number and management number of the object to which the IC label 1 is affixed.

An operator instructs the information reader to read the information including the identification ID stored in the IC chip 3 of the IC label 1. The data management device retrieves the management information in the database based on the information including the identification ID. The obtained management information is returned to the data management device or the information reader.

In this manner, the operator obtains information registered on the database such as shape, color, part number and management number of the object to which the IC label 1 is affixed. Whether or not substitution of the IC label 1 and forgery of the object to which the IC label 1 is affixed have occurred can be determined through a comparison between the obtained information (information on the database) and the object to which an actual IC label 1 is affixed in shape, color, part number and management number.

When the information including the identification ID stored in the IC chip 3 is read out by the information reader, management information which should be updated is added thereto, and thus updates the management information in the corresponding database via the data management device together with the information including this identification ID.

With this configuration, a method of controlling the IC label 1 and the object to which the IC label 1 is affixed can be established.

Second Embodiment

Next, a second embodiment of the invention will be described.

Figure 3A:
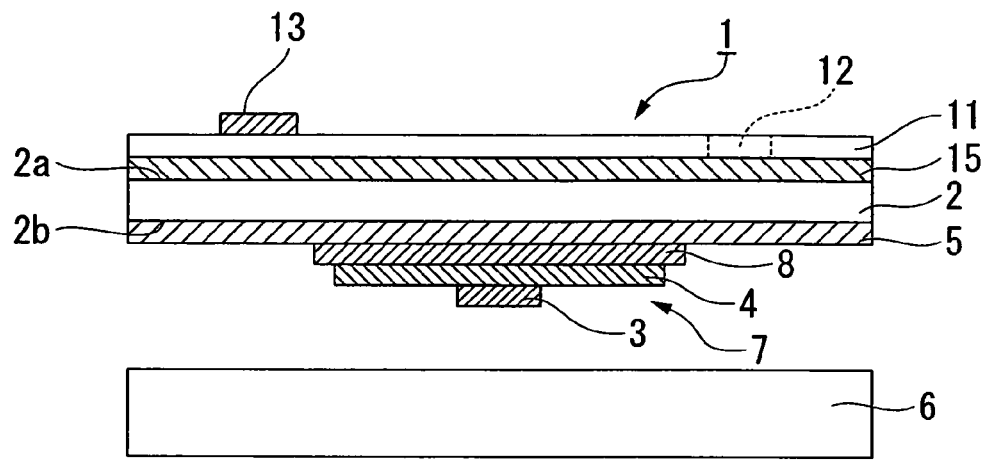
FIG. 3A is a sectional side view of a second embodiment of the IC label for prevention of forgery according to the invention.
Figure 3B:
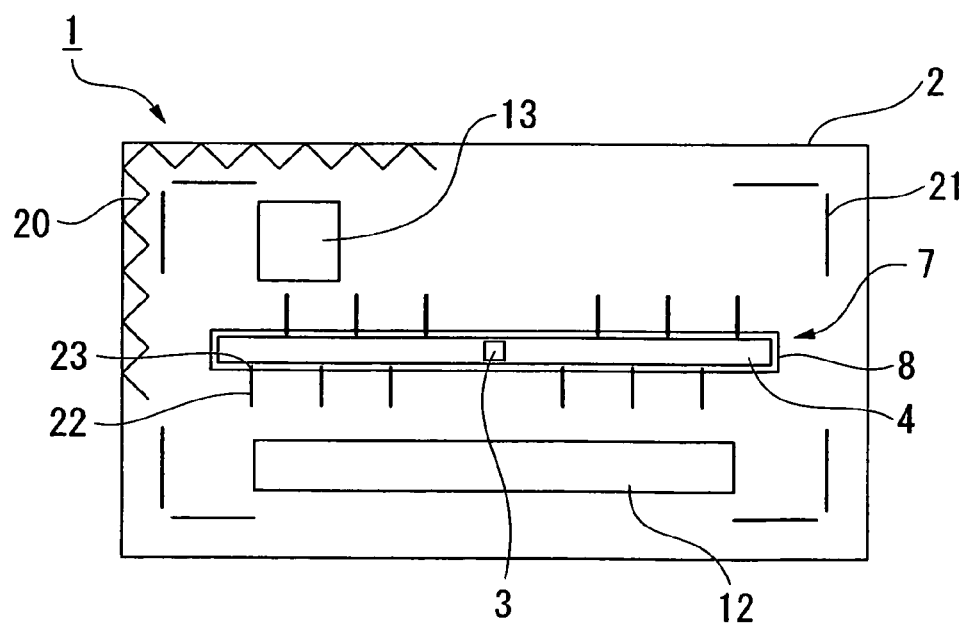
FIG. 3B is a plan view of the IC label for prevention of forgery.

FIGS. 3A and 3B show the second embodiment of the invention.

In FIGS. 3A and 3B, the same components as those in FIGS. 1 and 2 are denoted by the same reference numerals, and description thereof will be omitted.

The second embodiment shares the basic structure with the first embodiment. Thus, only differences will be described herein.

In the present embodiment, a number printed portion (optical identification portion) 12 is provided on a surface of the adhesive layer 5. An optically-readable optical identification ID (optical identification information) is written in the number printed portion 12.

The number printed portion 12 includes characters or the like written by removing an ink-printed area through laser irradiation. Accordingly, the optical identification ID in the number printed portion 12 cannot be easily counterfeited.

Examples of the optical identification ID may include simple alphanumeric characters which can also be visually recognized. Examples of the mechanical reading may include a one-dimensional bar code, a two-dimensional bar code, any image on which the identification ID is superimposed via an electronic watermark process, and array of dots and symbols.

The optical identification ID can be related to the identification ID recorded on the IC chip 3 in the following manner.

That is, in correlating the optical identification ID on the database and the identification ID of the IC chip 3, an optical identification ID is generated from the identification ID of the IC chip 3 by data conversion and the identification ID of the IC chip 3 is generated from the optical identification ID by data conversion.

In the data conversion, a function conversion including a cyclic redundancy check (CRC) and hash, symmetrical encryption, asymmetrical encryption, and the like may be employed.

When such an optical identification ID is used, authenticity of the IC label 1 can be verified visually or by using an optical reader in a simple manner.

The optical identification ID is formed on the surface of the IC label 1 on which the security function layer (security function portion) 13 is provided. That is, the number printed portion 12 and the security function layer 13 are provided on the same surface of the label substrate 2 to prevent photocopying of the IC label 1.

Forgery and counterfeit of the optical identification ID can be prevented by printing the optical identification ID in the upper part or the lower part of the security function layer 13, or laser-writing with ink entrained in the security function layer 13.

Optical identification ID can be recorded on IC chip 3. In this case, upon reading of the information from the IC chip 3, the optical identification ID registered in the IC chip 3 can be taken out. Forgery of the IC label 1 can be prevented by comparing the optical identification ID taken out from the IC chip 3 with the optical identification ID printed on the IC label 1.

In the IC label 1 according to the present embodiment, as described above, the IC chip 3 may be used on which information including the identification ID cannot be re-written, and the identification ID may be a unique ID.

In this case, the optical identification ID is associated on the database along with the information including the identification ID recorded on the IC chip 3. The information including the identification ID recorded on the IC chip 3 is read by the information reader, and the optical identification ID registered on the database is obtained based on the information including the identification ID. Forgery of the IC label 1 can be prevented by comparing the thus obtained optical identification ID on the database with the optical identification ID printed on the IC label 1. In this case, since the information including the identification ID of the IC chip 3 cannot be forged, so prevention of forgery of the IC label 1 is highly effective.

In the IC label 1 according to the present embodiment, the IC chip 3 on which the information including the identification ID cannot be re-written may be used. The identification ID may be a unique ID. The optical identification ID generated from the information including the identification ID recorded on the memory using a function conversion including CRC and hash, symmetrical encryption and asymmetrical encryption, may be printed on the IC label 1.

In this case, the information including the identification ID of the IC chip 3 is read by the information reader, and the data conversion, which is the same as in the generation of the optical identification ID, is carried out by the information reader to generate a comparative optical identification ID. Forgery of the IC label 1 can be prevented by comparing the generated comparative optical identification ID with the optical identification ID printed on the IC label 1.

In this case, since the information including the identification ID of the IC chip 3 cannot be forged, so prevention of forgery of the IC label 1 is highly effective. Unless the data conversion algorithm for generating the optical identification ID at the time of generating the optical identification ID and printing the ID to the IC label and the data conversion algorithm for generating comparative optical identification ID by the information reader from the information including the identification ID of the IC chip 3 read by the information reader correspond with each other, the optical identification IDs of both algorithms do not correspond with each other. That is, whether or not a proper data conversion algorithm exists in the information reader can also be confirmed, and authenticity of the information reader can also be verified.

Further, the information including the identification ID may be written in a non-rewritable memory by the manufacturer. Thus, even if a memory is used in which the information including the identification ID cannot be re-written and the identification ID is a unique ID, forgery of the IC label 1 can be prevented in a simple manner on site without accessing the database.

In the above description, data conversion using a function conversion including hash, symmetrical encryption and asymmetrical encryption is conducted from the information including the identification ID recorded on memory to generate the optical identification ID. An arbitrary cryptographic key can be used for the data conversion.

In this case, the optical identification ID printed on the IC label 1 and the comparative optical identification ID generated inside the information reader based on the information on the identification ID of the IC chip 3 correspond only when the following two conditions are satisfied.

1) the data conversion algorithm for generating the optical identification ID at the time of generating the optical identification ID and printing the ID to the IC label 1 and the data conversion algorithm for generating comparative optical identification ID by the information reader from the information including the identification ID of the IC chip 3 read by the information reader correspond with each other 2) the cryptographic key used with the data conversion algorithm for generating the optical identification ID at the time of generating the optical identification ID and printing the ID to the IC label 1 and the cryptographic key used with the data conversion algorithm for generating comparative optical identification ID by the information reader from the information including the identification ID of the IC chip 3 read by the information reader correspond with each other In particular, an operator may input the cryptographic key to the information reader and the cryptographic key may be managed to be known only by certain persons. Thus, both of authenticity of the information reader and authenticity of the operator (whether or not the operator has information on the cryptographic key) can be verified.

The identification ID can be built in the following ID format.

Identification ID=Header+Service identifier+Service ID+Unique ID+EDC, wherein the header defines the type of the identification ID, and may have registered thereon a bit length of the identification ID, types of timing signals and commands to be used, type of the ID format, and other information concerning the identification ID.

The service identifier defines the bit length of the service ID.

The service ID divides the identification IDs into groups and sets up the same ID for each group of customers, usage, intended purposes, managing purposes, and other groups of the identification IDs.

The unique ID never overlaps with other IDs at least in the individual service identifier. That is, the sequence of the service ID and the unique ID have secured the inherent characteristic as the identification ID.

An error detection code (EDC) is generated during the data conversion from the identification ID except the EDC portion. The EDC aims at verifying authenticity of the identification ID. That is, when abnormalities occur in the identification ID due to malfunction of the reading operation of the identification ID, authenticity of the identification ID is verified through comparison of the EDC read out at the read-out of the identification ID with the EDC generated by the data conversion from the portion excluding the EDC from the read identification ID. If the read EDC and the EDC generated by the data conversion correspond with each other, it is determined that authenticity of the identification ID is verified. If they do not correspond with each other, it is determined that a read error has occurred or the identification ID is no longer valid, and the identification ID is not considered as authentic. The method of the data conversion to generate the EDC may include a function conversion including CRC and hash, symmetrical encryption and asymmetrical encryption.

The header may be omitted.

The header may be omitted if the service identifier is fixed information. In this case, the service ID may have a fixed length, or it may be omitted.

The service ID may be omitted. If the service ID is omitted, the information showing that no service ID exists in the service identifier may be registered, or both of the service identifier and the service ID may be omitted. When no service ID exists, the inherent characteristic is secured as an identification ID using the unique ID.

The EDC can be omitted when demand for authenticity of the identification ID is low.

When such an ID format is adopted and the service ID is used, the group of customers, usage, intended purposes, managing purposes to which the identification ID belongs, and other groups of identification IDs can be distinguished by merely reading the identification ID.

For example, when the IC label 1 is used for a certain purpose, a specific service ID is used for the IC chip 3 of the IC label 1 used for the purpose, and the service ID is not used for other purposes. With such management, one can determine whether or not a service ID is suitable for the specific purpose by merely reading the identification ID and identifying the service ID. In addition, one can determine whether the identification ID is suitable for the specific purpose.

Additional procedures may sometimes be required such as data conversion and sending of the identification ID to an information processor after reading the identification ID. In such a case, by recognizing the service ID and processing only the identification ID suitable for the purpose, a number of unnecessary processes can be omitted. Thus, reliability of the system can be improved. Authenticity of the label for forgery prevention can be verified in a simple manner by determining whether or not a predetermined service ID is contained in the read identification ID.

In a case in which the identification ID and the management information are kept in a database, authenticity of the label for forgery prevention can be verified in a simple manner by determining whether or not a predetermined service ID is contained in the read identification ID. Thus, authenticity of the IC label 1 can be verified in a simple manner even if one has no connection with the database. This is especially useful when the information reader is a handy, small and simple device which does not necessarily have connectivity to a database.

For example, a customer A affixes an IC label 1 with a service ID of "0001" to each of supplies for management of plural supplies stored in his/her office building B. An ID issuer using an ID issuing device refers to the customer A directly or indirectly, and assigns "0001" as a service ID only to the IC label 1 which the customer A affixed to the supply stored in the building B. The ID issuer does not issue an identification ID with a service ID of "0001" for other purposes.

A customer C affixes an IC label 1 to each of notebook computers which staffs of his/her company carry out of the office. The ID issuer using the ID issuing device refers to the customer C directly or indirectly, and assigns "0010" as a service ID only to the IC label 1 which the customer C affixes to the notebook computer for carrying out of the office. The ID issuer does not issue an identification ID with a service ID of "0010" for other purposes.

When the identification ID is read by the information reader and the service ID is found to be "0001", the customer A can immediately recognize that the article to which the IC label 1 is affixed is the article registered as a supply stored in the building B. Accordingly, authenticity can be verified in a simple manner. When the identification ID is read by the information reader and the service ID is found to be "0010", the customer C can immediately recognize that the article to which the IC label 1 is affixed is the article registered in a notebook computer for carrying out of the office. Accordingly, authenticity can be verified in a simple manner.

The customer A reads the identification ID, and only when he/she finds the service ID is "0001", sends the identification ID to the information processor and accesses the database for management of the supply stored in the office building B. Then, the customer A performs required data processing. Upon finding that the service ID is not "0001", the customer A does not execute these processes. Thus, unnecessary data processing is not required, and unnecessary processes can be omitted to improve system reliability. The customer B also obtains the same effect by executing data processing only when the service ID is "0010."

Third Embodiment

Next, a third embodiment of the invention will be described.

Figure 4A:
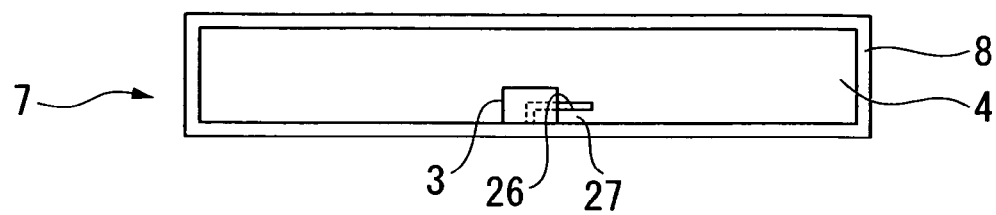
FIG. 4A is a plan view of a third embodiment of the IC label for prevention of forgery according to the invention.
Figure 4B:
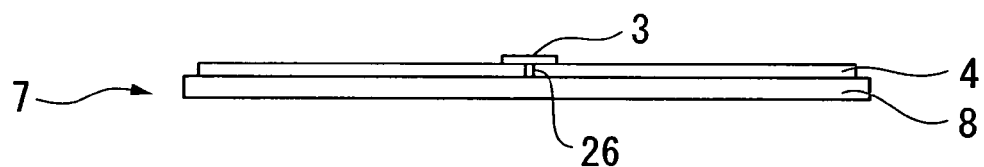
FIG. 4B is a side view of the IC label for prevention of forgery.
Figure 4C:
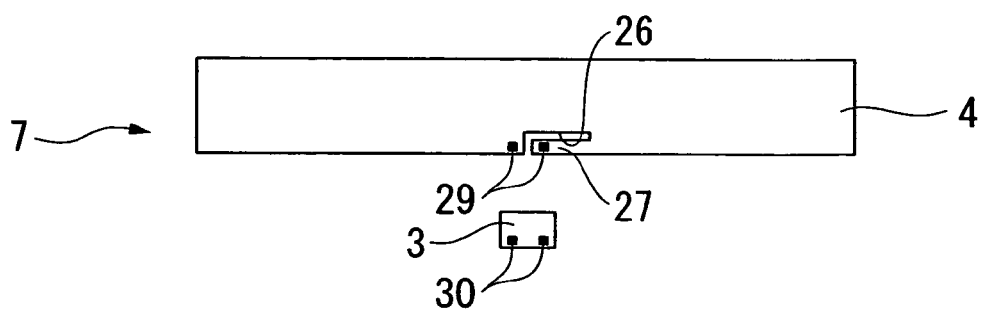
FIG. 4C is an exploded view of an IC chip and an antenna of the IC label for prevention of forgery.

FIGS. 4A to 4C show the third embodiment of the invention.

In FIGS. 4A to 4C, the same components as those in FIGS. 1 to 3B are denoted by the same reference numerals, and description thereof will be omitted.

The third embodiment shares the basic structure with the first embodiment. Thus, only differences will be described herein.

In the present embodiment, a hook-shaped antenna slit 26 is formed in a longitudinal direction central portion of an antenna 4 for performing impedance matching between an IC chip 3 and the antenna 4. A stub 27 is formed by the antenna slit 26.

The width of the antenna slit 26 is narrower than terminal intervals (interval of electrodes 30) of the IC chip 3. Power feeding portions 29 are provided to oppositely face each other with the antenna slit 26 disposed therebetween. The IC chip 3 is provided to straddle the antenna slit 26 so as to electrically connect the electrode 30 and the power feeding portions 29.

In the present embodiment, the stub 27 formed by the antenna slit 26 is connected in series between the antenna 4 and the IC chip 3. Thus, the stub 27 works as an inductor component for antenna input impedance. With the inductor component, capacitive component of the input impedance of the IC chip 3 can be offset and the antenna input impedance and the input impedance of the IC chip 3 can be matched. Appropriate setting of the impedance matching can transmit electric power generated at the antenna 4 efficiently to the IC chip 3.

The impedance matching varies depending on the materials used in the IC label 1 or influence of a dielectric constant of the object to which IC label 1 is affixed. The impedance matching can be improved by changing the length of the antenna slit 26. Conversely, an optimum design of the antenna slit 26 may sometimes be needed based on the materials required for the IC label 1, the materials of the object to which the IC label 1 is affixed, and the environment.

In the first to third embodiments, the IC tag 7 may be provided to incline with respect to the label substrate 2.

Figure 6:
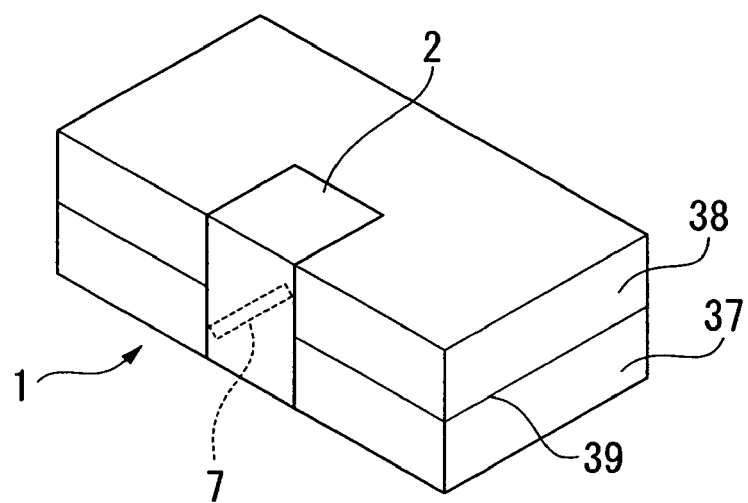
FIG. 6 is an explanatory view showing a state in which an IC label for prevention of forgery is affixed to an object with an IC tag inclined with respect to a label substrate.

If the IC tag 7 is inclined, the IC label 1 may be affixed to straddle a mating surface 39 of a case 37 and a lid 38 as shown in FIG. 6. Thus, the IC tag 7 is also disposed to straddle the mating surface 39.

Therefore, when the lid 38 is separated from the case 37, not only the sealing IC label 1 but the IC tag 7 can be destroyed. If someone breaks the label substrate 2 along the mating surface 39 in an attempt to remove the IC tag 7, the IC tag 7 is also broken. With this configuration, re-use of the IC tag 7 can be prevented reliably.

Next, examples and comparative examples of the invention will be described.

A common IC tag (non-contact IC medium) was used throughout the examples.
(IC Tag in each Example)

An antenna was formed through etching an aluminum thin film formed on a 38 μm-thick PET film (base film). Cut-outs 23 as shown in FIGS. 2 and 3B were formed in a circumference of the antenna at intervals of 4 mm. A feed terminal of the antenna and gold bumps of the IC chip were electrically connected and fixed using an anisotropic conductive adhesive agent to form an IC tag.

EXAMPLE 1

Cut-outs were provided in the label substrate of art paper (60 mm in width, 39 mm in length, and 90 μm in thickness).

The cut-outs were the same as those shown in FIGS. 2 and 3B. That is, the cut-out 20 provided in outer circumference of the label substrate was formed in a continuous zigzag shape with length of 3 mm and width of 1.5 mm. As shown in FIGS. 2 and 3B, the cut-out 21 formed at each corner of the label substrate was L-shaped with 7.5 mm-long slits running along the contour of the corner of the label substrate. The corner portion of the L shape remained uncut. The corner portion of the cut-out 21 was easily broken to leave a trace of removal of the label affixed to the object, which was easy to find. The cut-outs 22 were provided at an area where the antenna is placed to overlap the cut-outs 23 of the antenna at intervals of 4 mm. Ink with solvent color development property was applied to the surface (the first principal surface) of the label substrate to form a solvent color developing layer. A pattern was printed on the solvent color developing layer by offset printing to form a printed layer. A security function layer 13 was printed on the printed layer with fluorescent ink which becomes luminous when irradiated with ultraviolet light. An acrylic adhesive agent having adhesion of 30000 mN/25 mm was applied on the back surface (i.e., the second principal surface) of the label substrate. The non-contact IC medium (IC tag) was affixed to the adhesive agent to form an IC label A. A separator as a peel off sheet was temporarily attached to the adhesive agent. The separator (112 μm in thickness) formed by laminating polyethylene on one side of a sheet of kraft paper and then siliconized was temporarily attached to the adhesive agent as a peel off sheet.

EXAMPLE 2

A solvent color developing layer, a printed layer and a security function layer 13 which becomes luminous when irradiated with ultraviolet light were formed on the first principal surface of the label substrate. The label substrate has slits as in the Example 1. A second security function layer 13 was formed on the security function layer 13 by printing with specific ink which becomes luminous when irradiated with infrared light with a wavelength of 780 nm. An acrylic adhesive agent with adhesion of 30000 mN/25 mm was applied to the second principal surface of the label substrate. A non-contact IC medium (IC tag) was attached to produce an IC label substrateparator (112 μm in thickness) which is the same as that in Example 1 was temporarily attached to the adhesive agent as a peel off sheet.

Comparative Example 1

A pattern was printed on the surface of a breakable film base to form a printed layer. An IC tag having no cut-outs 23 around the antenna was laminated on the back surface of the film base using the same non-contact IC medium as in Examples 1 and 2. The film base had cut-outs only in the circumference thereof. Thus, an IC label C was manufactured which had no cut-outs on the label surface and the IC tag portion in contrast with Examples, and had neither a solvent color developing layer nor a security function layer (the IC tag C only had a printed layer).

Comparative Example 2

A printed layer as formed by printing a pattern on one surface of the breakable film base and an IC tag was laminated on the back surface as in Comparative Example 1. An adhesive layer with adhesion of 5000 mN/25 mm was provided thereon to produce an IC label D.

(Experiments)

Figure 5:
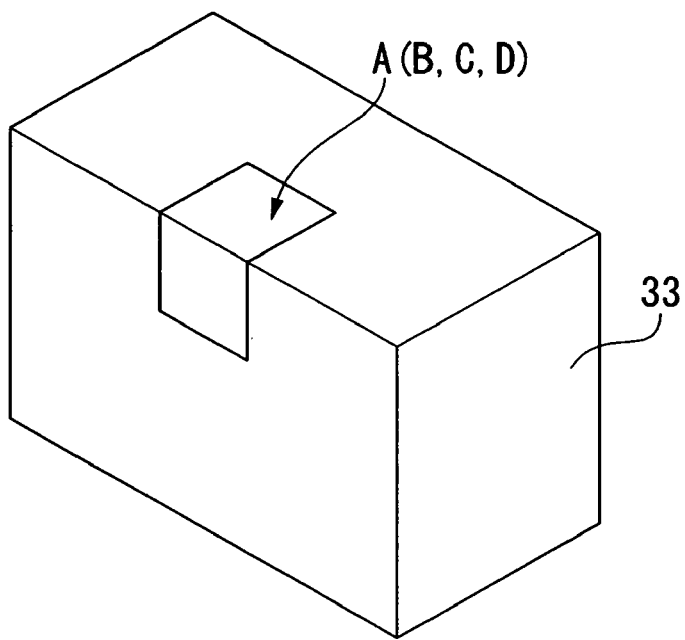
FIG. 5 is a perspective view showing a state in which an IC label is affixed to seal a box containing an article.

The thus-manufactured IC labels A, B, C and D of Examples 1, 2 and Comparative Examples 1 and 2 were affixed to each box 33 containing an article as shown in FIG. 5. Then, the IC labels A, B, C and D were carefully removed from the box 33.

In the IC labels A and B of Examples 1 and 2, the label substrate and the antenna were broken at the same time from the four slits to completely destroy the function as a non-contact IC label. When the IC labels A and B were removed from the box 33 using a solvent, the solvent color developing layer developed color due to the solvent. Thus, a clear trace of removal was confirmed. A label substrate manufactured by color photocopying the label substrate from which the IC tag was removed and making cut-outs similar to those of authentic label substrate was confirmed as a forged label since it has no security function layer. In the IC label B of Example 2, the security function layer could be confirmed when irradiated with an infrared lamp. Thus, the IC label B was able to be distinguished from those forged or replicated.

In the IC labels C and D of Comparative Examples 1 and 2, the label substrate could be broken when they were peeled off with great force due to slits and difference in adhesive strength. However, when peeled carefully, the IC labels C and D were not broken. Especially, the antenna was hard to break. It was possible to remove the IC labels C and D from the box 33 easily by using a solvent. The peeled IC labels C and D were able to be reused by affixing to another box. The IC labels were easily forged by color photocopying the pattern thereon.

The technical range of the invention is not limited to the described embodiments and various modifications may be made without departing from the scope of the invention.

What is claimed is:
1. An IC label for prevention of forgery comprising:
a label substrate which has an adhesive agent for affixing the same to an object;
a non-contact IC medium which is provided on the label substrate and has an IC chip for storing predetermined identification information and an antenna for wireless transmission of the identification information; and
a security function portion which is provided on the label substrate so as to be adjacent to the antenna in a width direction of the antenna, the security function portion being greater than the antenna in size in the width direction of the antenna, wherein
a cut-out is formed in the label substrate so as not to reach a periphery of the label substrate,
a cut-out is formed in the non-contact IC medium, and
at least a part of the cut-out formed in the label substrate is continuous with the cut-out formed in the non-contact IC medium in planar view.

2. The IC label for prevention of forgery according to claim 1, wherein the label substrate is formed of a breakable material.

3. The IC label for prevention of forgery according to claim 1, wherein the label substrate includes a solvent detection portion which is dissolved by a peeling solvent for peeling the label substrate affixed to the object, or reacts chemically with the peeling solvent.

4. The IC label for prevention of forgery according to claim 1, wherein the label substrate includes a heat detection portion which undergoes color change when heated or reacts chemically by the effect of heat.

5. The IC label for prevention of forgery according to claim 1, wherein the identification information is intrinsic identification information for each IC chip.

6. The IC label for prevention of forgery according to claim 1, wherein the identification information is correlated with management information for management of the object.

7. The IC label for prevention of forgery according to claim 1, wherein:
the IC chip includes a read-only memory; and
the identification information is stored in the read-only memory.

8. The IC label for prevention of forgery according to claim 1, wherein the security function portion includes at least one of:
an OVD functional material which undergoes color change depending on an angle of light incident on the security function portion or an angle of visual recognition of the security function portion;
a fluorescent material or a phosphorescent material excited by electromagnetic waves of a specified wavelength to emit electromagnetic waves of a wavelength different from that of the specified wavelength; and
a liquid crystal material which has polarizability of a specific pattern and displays the pattern by taking out specifically polarized light.

9. The IC label for prevention of forgery according to claim 1, wherein:
the label substrate includes an optical identification portion which has optically readable optical identification information; and
the identification information and the optical identification information are at least partly correlated with each other.

10. The IC label for prevention of forgery according to claim 9, wherein the security function portion and the optical identification portion are provided on the same surface of the label substrate.

11. The IC label for prevention of forgery according to claim 1, wherein the label substrate is formed of a breakable material of which any one of the tensile strength, breaking strength, and tearing strength is equal to or less than the adhesion strength of the adhesive agent.

12. The IC label for prevention of forgery according to claim 1, wherein the adhesive agent is arranged between the label substrate and the non-contact IC medium so that the label substrate is capable of being affixed to the object with the non-contact IC medium being not adhered to the object.

13. The IC label for prevention of forgery according to claim 1, wherein the cut-out formed in the non-contact IC medium reaches the antenna.

* * * * *